Sept. 22, 1970  W. E. REED  3,529,419
GAS TURBINE ENGINE AND CONTROL SYSTEM
Filed July 23, 1968  3 Sheets-Sheet 1

FIG. 1

INVENTOR
WENDELL E. REED

Strauch, Nolan, Neale,
Nies & Kurz
ATTORNEYS

INVENTOR
WENDELL E. REED

United States Patent Office 3,529,419
Patented Sept. 22, 1970

3,529,419
GAS TURBINE ENGINE AND CONTROL SYSTEM
Wendell E. Reed, Chula Vista, Calif., assignor to International Harvester Company, Chicago, Ill., a corporation of Delaware
Filed July 23, 1968, Ser. No. 746,922
Int. Cl. F02c 3/10, 9/04, 9/02
U.S. Cl. 60—39.16
15 Claims

ABSTRACT OF THE DISCLOSURE

A gas turbine engine for highway vehicles including a gas producer turbine, a free power turbine, and a variable positionable nozzle between the turbines, the nozzle being positionable in a forward directional range in which driving power is applied to the power turbine and a reverse direction in which a braking torque is applied. A control system regulates fuel flow and positions the nozzle in response to power turbine outlet temperature, a speed selector, and the speed of the gas producer turbine to maintain and govern the selected speed and temperature and to provide rapid acceleration or decleration while safeguarding against excessive temperature or compressor surge or flameout. The control system also reversely positions the nozzle in response to the speed of the power turbine and the transmission input shaft coupled thereto to apply braking torque to the power turbine to prevent overspeed. The speeds of the lower turbine and transmission are also synchronized prior to clutch engagement, except if this would cause overspeeding of the power turbine, in which case a clutch inhibitor device prevents such engagement. The fuel flow schedule is compensated for variations in ambient air and exhaust gas temperatures and changes in altitude.

BACKGROUND OF THE INVENTION

This invention relates generally to gas turbine engines and more particularly to a novel fuel and nozzle control system for gas turbine-powered highway vehicles, the control system producing maximum operating efficiency, increased equipment life, and safety of operation, and power response.

In the past, vehicle gas turbine power plants have operated rather inefficiently and have resulted in vehicle handling and control problems.

Generally, regulation of fuel flow has been relied on to control the power delivered to the turbine and thus the speed of the turbine and vehicle. Such an approach, however, does not provide for safe, rapid acceleration and decleration within minimum time as is desired in turbine systems, and additionally does not adequately control or govern the turbine speed at the desired level.

Prior turbine arrangements have also failed to respond to changes in temperature of the exhaust gases when such gas is used to preheat combination air and reduce fuel requirements. As a result, quite often the combustible fuel and air mixture is not properly established and problems such as compressor surge, turbine over-temperature and lean mixture extinction are encountered.

In the application of gas turbines to automobile vehicles, the transmission of power from the turbine to the driving wheels has presented problems of substantial proportions primarily because of the inability for accurately controlling the speed of the free power turbine and the relatively sluggish response of the turbine to acceleration and deceleration control signals.

As is well-known, the use of a standard vehicle transmission requires synchronization between the speed of the output shaft of the power plant and the matching components of the transmission to permit shifting from one gear to another. Lack of synchronization imposes unacceptable loads on the clutch and the transmission components or the power plant itself or in extreme cases, may prevent engagement of the gears altogether. Despite extensive efforts, the problem of synchronization of the turbine and transmission has, for all practical purposes, prevented the utilization of a standard transmission and clutches in gas turbine powered vehicles and has severely restricted the application of gas turbines in vehicles.

Previously, gas turbine gas power plant arrangements incorporating gas producer and free power turbine units and a variable nozzle between the units to vary the power output have been suggested for some applications. One such arrangement is illustrated in U.S. Pat. No. 2,895,295. However, no known proposed arrangement has satisfactorily overcome the disadvantages noted above particularly associated with highway vehicles.

SUMMARY OF THE INVENTION

A principal object of the present invention is to provide a novel control system for a gas turbine power plant which permits close control of the speed of the free power turbine and a rapid transition from one one selected to another to provide, in a gas turbine, speed response characteristics at approximately those of a conventional reciprocating engine and, thus, permitting the utilization of a standard clutch operated transmission in the power train between the turbine and the driving wheels.

Another object is to provide a gas turbine-powered engine for highway vehicles including a novel control system which permits rapid acceleration and deceleration while promoting fuel economy, reducing engine wear, and improving vehicle handling.

Another object is to provide a novel control system for a gas turbine engine which comprises a gas producer turbine, a free power turbine, and a variable positionable nozzle between the turbines, the control system regulating both the flow of fuel and the nozzle position in response to a speed selector, gas producer speed, free power turbine speed, transmission speed, and power turbine outlet temperature to control the operating temperature and speeds of the turbines.

Still another object is to provide a control system for a gas turbine engine including a variable positionable nozzle located between a gas producer turbine and a free power turbine, the control system adjusting the nozzle to aid in acceleration and decleration of the gas producer turbine, to promote fuel economy, and also to apply a braking torque to the power turbine to prevent overspeed thereof.

A further object is to provide a control system for a gas turbine engine including a power turbine, with a control system synchronizing power turbine speed with transmission speed during a gear shifting operation except when synchronizing would overspeed the power turbine, in which case the control system also inhibits clutching engagement between the transmission an power turbine.

Still a further object is to provide a gas turbine engine control system which compensates a fuel scheduling program for changes in ambient air and exhaust gas temperatures and variations in altitude.

Another object is to provide a compact, self-contained control unit in which individual control elements perform a plurality of control functions in the overall system, thus simplifying the control unit by reducing the total number of elements required. In this regard, the various individual elements function in a specific control sub-system, such as fuel scheduling or nozzle positioning, and at the same time are so interconnected and interrelated that they cooperate with each other in the same control unit to provide the overall engine regulation.

In summary, the above objects are accomplished by providing a novel fluid operated control system for a gas turbine engine which includes a gas producer turbine, a free power turbine, and a variable positionable nozzle between the turbines to control the power transferred to each turbine by the combustion gases passing therethrough. The control system regulates the fuel flow to the combustion system and adjusts the nozzle position in response to power turbine outlet temperature, a manually operated speed selector and the speed of the gas producer turbine so that the fuel and nozzle together effectively control the speed and operating temperature of the gas producer turbine. In addition, the control system includes a braking control mechanism which urges the nozzle to a reverse position to apply a braking torque to the power turbine whenever an overspeed condition exists.

In conjunction with the braking mechanism, the control arrangement adjusts the nozzle position to apply braking torque to the power turbine to synchronize the speeds of the power turbine and drive transmission during a gear shifting operation, whenever this will not cause overspeed of the power turbine. Also, a clutch inhibitor device responsive to transmission speed prevents clutching engagement between the transmission and power turbine whenever the transmission speed is in excess of a predetermined maximum.

The control system includes apparatus to compensate the fuel flow schedule for changes in altitude and ambient air and exhaust gas temperatures to limit available shaft power on cold days, thereby preventing overload of the transmission and drive line, and to provide safe and efficient acceleration and deceleration at various altitudes.

Accordingly, the novel control system accomplishes the above general objects and the following specific objects, to:

(1) Schedule fuel flow for engine lightoff;

(2) Schedule the speeds of the power turbine and gas producer versus power lever position;

(3) Schedule the fuel flow for rapid acceleration from lightoff to maximum speed with a smooth power transition between speeds so as not to exceed a maximum recuperator gas-in temperature ($T_R$), or a possible compressor surge limitation, or a maximum turbine inlet temperature ($T_I$);

(4) Make provision for scheduling deceleration fuel flow to prevent lean mixture extinction;

(5) Above idle, during steady-state operation, control fuel and nozzle to maintain the selected gas producer speed, while maintaining the recuperator gas-in temperature ratio ($T_R/T_A$) at a fixed value, except as necessary to prevent exceeding a maximum steady-state turbine inlet temperature ($T_I$) limit, or a maximum recuperator gas-in temperature ($T_R$).

(6) When the power turbine speed is below that requested by the operator, schedule the variable power turbine nozzle in the neutral maximum area position at parked idle or at any speed below idle and during accelerations; and in the closed forward driving position during decelerations;

(7) Limit the power turbine speed to that requested by the operator by automatically actuating the variable nozzle toward the reverse position to apply braking power;

(8) Automatically synchronize the power turbine speed with the transmission counter shaft speed when the operator's clutch is disengaged, except as necessary to prevent overspeeding the power turbine;

(9) Prevent clutch engagement whenever this would result in power turbine overspeed or excessive clutch wear;

(10) Cutback gas producer speed during sustained braking operation to reduce fuel consumption and overtemperature;

(11) Provide a means of biasing the steady-state temperature ($T_R$) and maximum mechanical gas producer speed as a function of compressor inlet temperature ($T_A$). This arrangement limits power output at low ambient temperatures to the maximum output at 85° F.;

(12) Provide compensation in the acceleration schedule for changes in altitude.

Further objects and advantages will become apparent from the following detailed description of the preferred embodiment and a review of the appended claims.

DESCRIPTION OF THE PREFERRED EMBODIMENT

Figure 1:
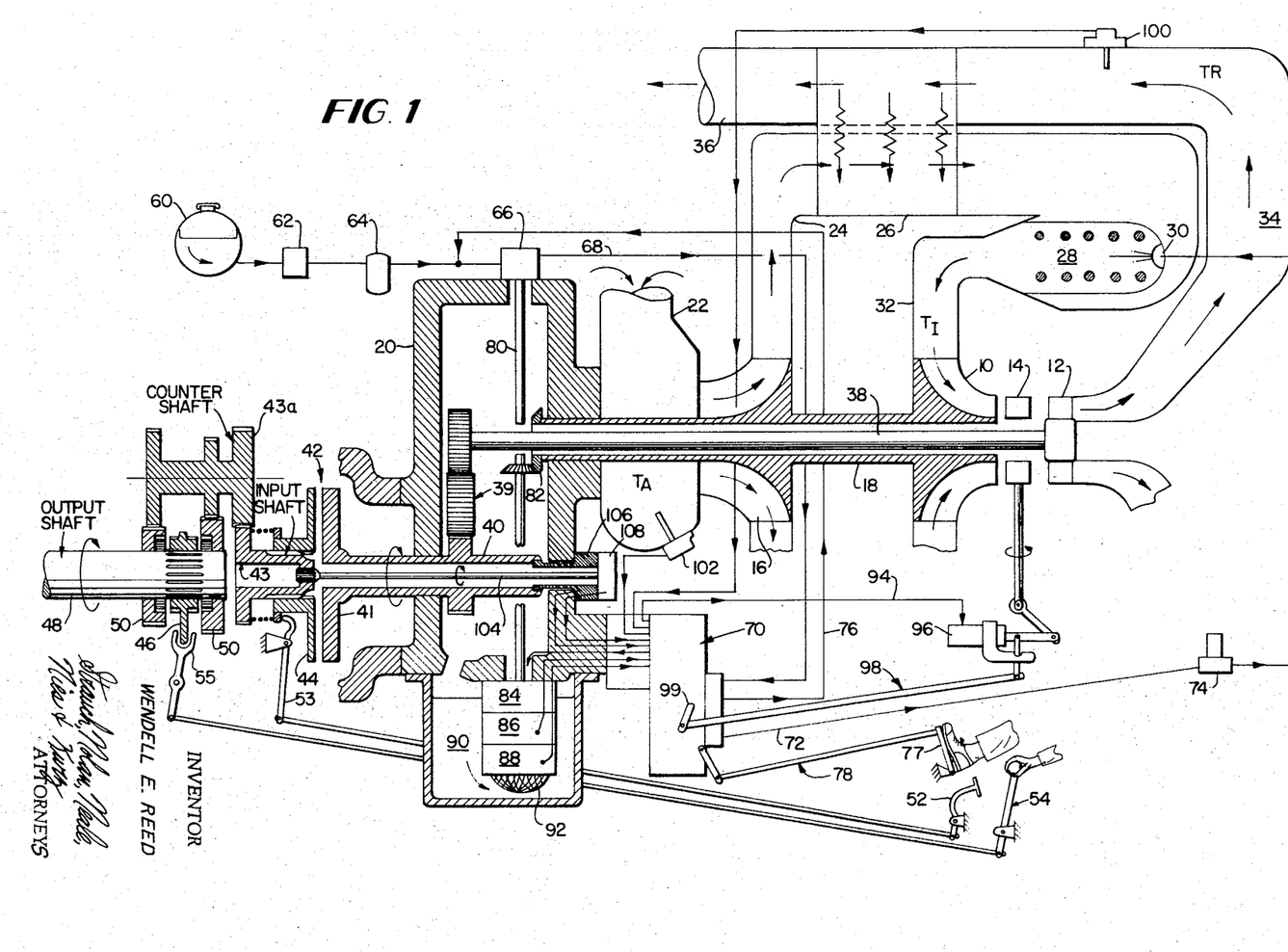
FIG. 1 is a semi-diagramatic view of a gas turbine-powered vehicle engine and transmission drive system constructed according to the invention.

The gas turbine-powered arrangement shown in FIG. 1 includes a gas producer turbine 10, a free power turbine 12, and a variable positionable nozzle vane assembly 14 located between the turbines. The turbine nozzle arrangement may be any of several conventional designs such as that illustrated by Pat. No. 2,895,295. Essentially, the nozzle 14 controls the distribution of power between the turbines 10 and 12. It is movable between a forward power driving position through a neutral position to a reverse driving position in which position it reverses the direction of torque applied to the turbine 12. When the nozzle is in the neutral position, there is maximum power input to the gas producer turbine and minimum power input to the power turbine. As the nozzle moves away from the neutral position into the forward range, the driving torque applied to the producer turbine is decreased and the power turbine increased. If the nozzle is moved in the opposite direction, the direction of impingement of the gases leaving the nozzle upon the power turbine blades is reversed and a braking torque is applied to the power turbine.

Gas producer turbine 10 drives compressor 16 through hollow turbine shaft 18 rotatively mounted in engine gear box 20. Compressor 16 draws air from inlet scroll 22 and delivers compressed air through duct 24 and recuperator 26 to combustion chamber 28 having a fuel burner 30. The heated and expanded gases then flow through passageway 32, gas producer turbine 10, nozzle 14, power turbine 12, exhaust duct 34, and recuperator 26, wherein they heat the air from compressor 16, and out through exhaust channel 36.

Turbine 12 is mounted on power turbine shaft 38 which extends through hollow shaft 18 and is suitably mounted for rotation relative thereto. Within gear box 20, shaft 38 is connected to hollow power turbine shaft 40 and clutch plate 41 of clutch mechanism 42 through a speed reducing gear 39. Transmission input shaft 43 is driven through the opposite clutch plate 44 to rotate transmission countershaft 43a and selectively connectable by slidable member 46 to output gear assembly 50 on output shaft 48. Clutch mechanism 42 is conventionally actuated by clutch pedal 52 and lever 53, and the slidable member 46 is shifted by gear lever 54 and linkage 55.

Fuel is delivered to burner 30 from fuel tank 60 through booster pump 62, filter 64, fuel pump 66, conduit 68, a fluid program control and regulating unit 70, conduit 72, and fuel shutoff valve 74. A fuel bypass conduit 76 directs a portion of the fuel back to fuel pump 66 in accordance with the fuel regulating schedule established by control unit 70.

A speed selector accelerator pedal 77 provides a mechanical signal into control unit 70 through linkage 78 indicative of the speed desired by the vehicle operator.

Mounted within engine gear box 20 is a control shaft 80 driven by gas producer shaft 18 through bevel gear assembly 82. Shaft 80 drives fuel pump 66 at one end and at the other end drives engine lubricating pump 84 actuator pump 86, and gas producer pump 88 located within lubricating oil sump 90, the pumps being provided with oil filter 92. The pumps 86 and 88 pump oil to control unit 70 which modulates the pump pressure in a manner to be described to control the amount of fuel delivered through conduit 72 to burner 30 and also to control the position of nozzle 14 through conduit 94 and nozzle actuator 96, which has a feedback linkage 98 and lever 99 to control unit 70. A temperature sensor 100 introduces an exhaust gas temperature ($T_R$) compensating signal into control unit 70 and temperature sensor 102 feeds an ambient air temperature ($T_A$) compensating signal into unit 70, both signals modifying the amount of fuel delivered to the burner 30.

Connected to transmission shaft 43 and passing through hollow power turbine shaft 40 is pump shaft 104 driving pump 108 at a speed proportional to the speed of shaft 43. A second pump 106 is driven by shaft 40 at a speed proportional to the speed of turbine 12. The pumps 106 and 108 deliver oil to control unit 70 as an indication of their relative speeds and assist in synchronizing the speed of the power shaft 40 with that of transmission shaft 43 prior to engagement of clutch plates 41 and 44 in a gear shifting operation.

Figure 2:
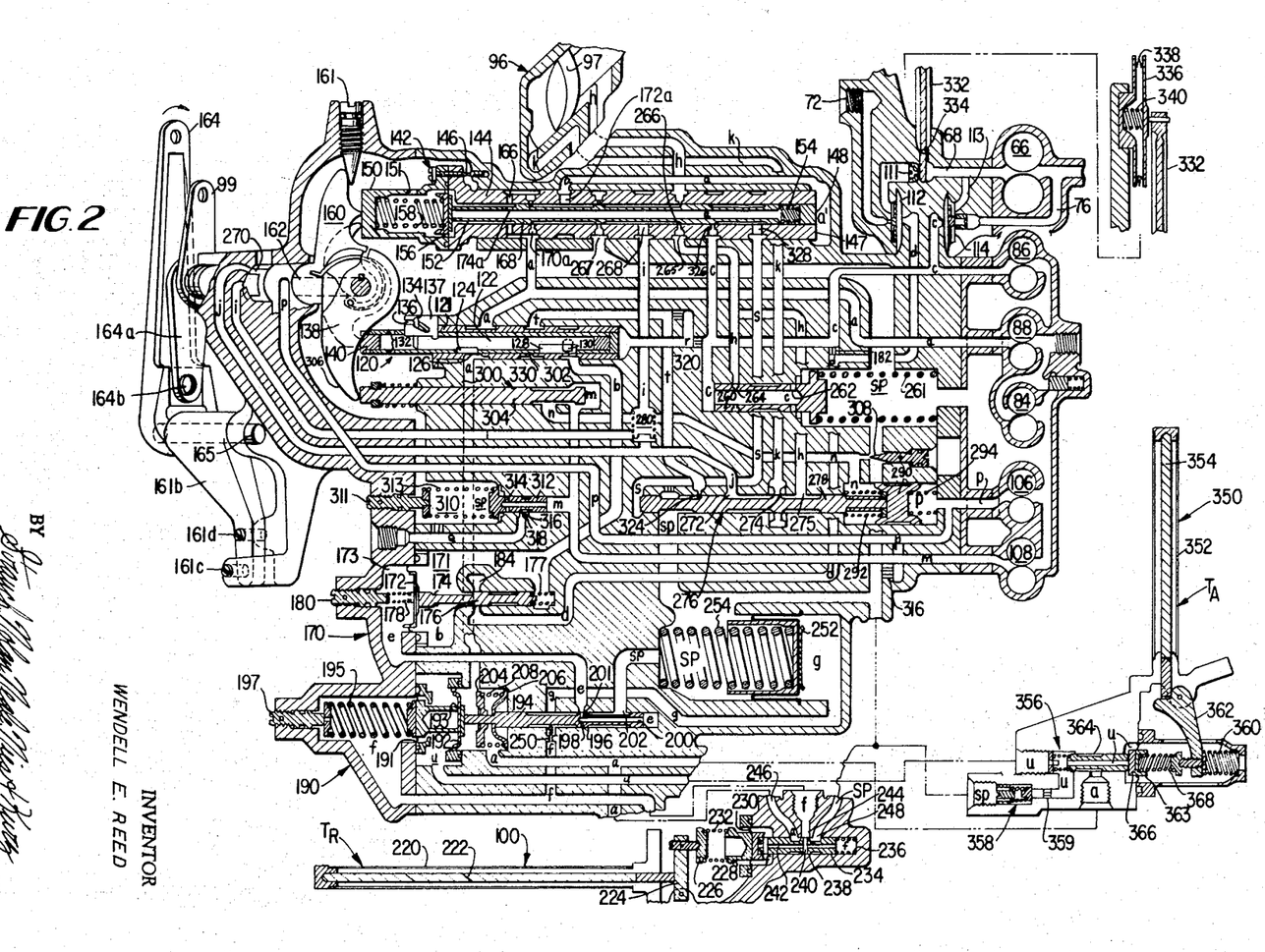
FIG. 2 is a partially sectioned view of the self-contained control unit of the invention.
Figure 3:
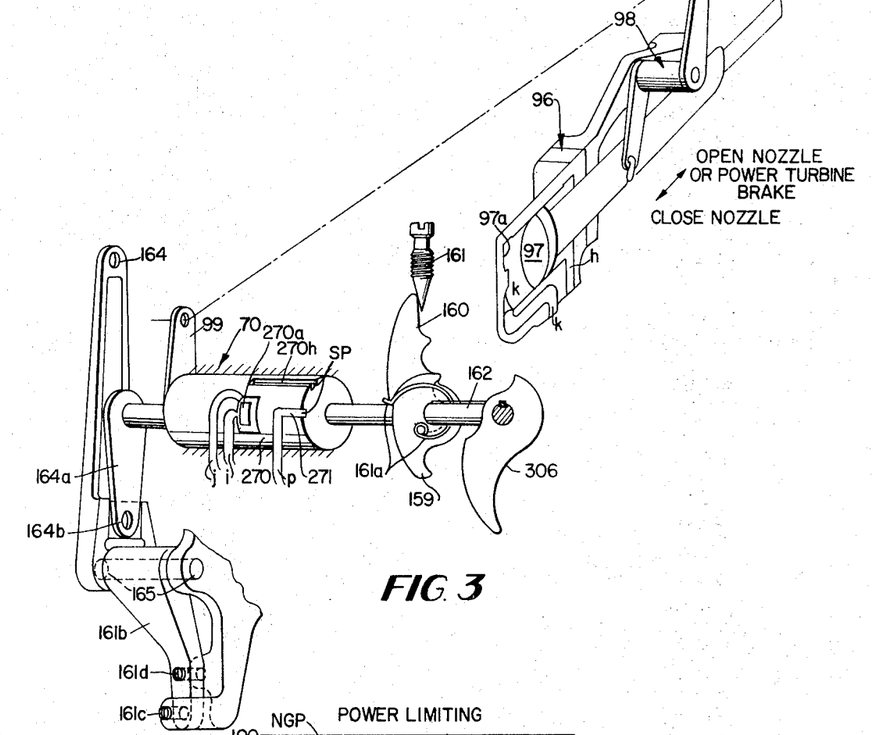
FIG. 3 is an enlarged schematic of the nozzle actuator and speed selecting mechanisms.

Referring now to FIGS. 2 and 3, the program regulating and control unit 70 and its functioning to control the fuel delivered to burner 30 and also to control the position of variable nozzle 14 will be described. The several operations of the control system will be individually described and will be related to each other to set forth their cooperation in the overall control function in accomplishing the objects set forth above.

BASIC FUEL CONTROL

The controller 70 is a self-contained and compact unit mounted on gear box 20. It houses the majority of the control mechanisms used to schedule the fuel flow and to operate nozzle actuator 96. The unit functions to schedule the flow of a fluid, e.g., engine lubricating oil, through flow control valves within a closed fluid system as a function of speed selector 77 and of gas producer turbine speed, and then converts this fluid flow schedule into a fuel flow schedule to burner 30.

Fuel from fuel pump 66 flows through line 68 and altitude compensating orifice 111 to a flow converter throttle valve 112, fuel line 72 and burner 30. Fuel also passes from line 68 through line 113 to flow converter bypass valve 114 and bypass line 76 back to the pump inlet. The relative amount of fuel which is delivered to the burner through throttle valve 112 as compared to that which is by passed through bypass valve 114 is dependent upon the pressure differential imposed upon the diaphragms of the converter valves, this differential being a function of the flow schedule of the lubricating oil next described.

Referring to FIG. 3, when it is desired to change speeds, pedal 77 is actuated to position power lever 164 which is pivoted at pin 165. A link 164a is pivotally connected at one end to lever 164 by pin 164b and at its other end is fixed to shaft 162. Movement of lever 164 thus causes a corresponding movement of link 164a to rotate shaft 162. Shaft 162 is rotatively, eccentrically mounted within nozzle stop valve 270 which rotates within control housing 70. The shaft 162 has fixed levers 159 and 306 connected at its other end. Lever 160 is rotatively mounted on shaft 162 and moved by member 159 at one end, with a biasing overtravel spring 161a urging them into operative engagement. Rotation of shaft 162 by power lever 164 causes corresponding rotation of lever 160 by member 159 which actuates the mechanism of control unit 70 as described hereinafter. The stop member 161b, which is part of lever 164 rotating on pin 165, and stop pins 161c and 161d establish the minimum and maximum engine operation speeds permitted. The stop valve 270 is rotated on shaft 162 by feedback lever 99 fixedly connected thereto and actuated by piston actuator 96 through centrally pivoted linkage 98.

Referring to FIG. 2, pump 88, which serves as a speed governor pump for gas producer turbine 10, receives oil from lubricating pump 84 and delivers it through fluid path $a$ to a rotary spool, flow metering valve 120 which includes an outer sleeve 121 and a hollow spool 122. The spool has a rearward slot 124 adapted to communicate with fluid $a$ through sleeve port 126 upon simultaneous rightward movement and rotation of spool 122 within sleeve 121. Spool 122 also has a forward slot 128 which communicates with sleeve orifice 130 upon movement and rotation of the spool and rearward vent openings 132 which discharge the oil within the spool to the sump for recirculation through the various pumps. A spool cam finger 134 engages and follows cam slot 136 formed in cam 137 to cause rotation of the spool upon rightward movement thereof which results from counter-clockwise rotation of lever 138 centrally pivotally mounted on control casing 70 and engaging spool plug 140 and a servo sleeve assembly 142.

The servo sleeve assembly 142 includes an outer sleeve 144 slidingly mounted within casing 70 and guided therein by guide pin 146, the sleeve being closed at one end 147 by plug 148 and having at the other end flange member 150 with a sump vent 151. Spaced along sleeve 144 are a number of ports through which oil passes under the control of hollow internal slide valve 152 biased at one end from plug 148 by spring 154 and connected at its other end to diaphragm 156, which is biased away from flange 150 by spring 158. The flange 150 engages lever 138 and, upon leftward movement of sleeve 144 during acceleration or turbine 10, rotates the lever counter-clockwise to drive spool 122 to the right.

Movement of sleeve 144 is limited by lever 160 against which flange 150 abuts during steady-state operation, the position of the lever being determined by shaft 162 which is rotated by power lever 164 actuated by the accelerator pedal 77 and linkage 78 as discussed previously.

Fluid $a$ passes through sleeve port 166 filling the space between diaphragm 156 and valving element 168, and also enters hollow valve 152 through aperture 174a, and when pressure fluid $a$ exceeds a designed pressure (60 p.s.i.) it slides the valve to the left relative to sleeve 144 against the bias of spring 158. Fluid $a$ also enters through port 170a to port 172a to abut against sleeve and 147 at a pressure $a$.

The control unit also includes a Delta P throttle valve 170 having a diaphragm 172 with a slide 174. The slide has a valve element 176 and biasing spring 177 on one side thereof and on the other side a spring 178, the bias of which is adjusted by threaded screw 180. The slide valve 176 slides within casing 70 against the bias of spring 177 and 178. From one side 171 of diaphragm 172 fluid $b$ is delivered to flow metering orifice 130 of valve 120 and passes through slot 128 into spool 122 to the sump through vents 132. The actuator pump 86 pumps oil from the sump through fluid path $c$ and a flow sensing orifice 182. Oil through path $d$ is then delivered to throttle valve port 184, the discharge area of which is controlled by slide valve element 176 to vary the volume of oil delivered to diaphragm side 171 and onto orifice 130.

The other side 173 of throttle valve diaphragm 172 is supplied with oil from fluid path $e$ from amplifier valve 190. The valve 190 includes diaphragms 191 and 192 separated by rigid spacer 193 and is biased inwardly from casing 70 by spring 195 and adjusting screw 197. The diaphragm 192 is acted on by fluid $a$ from flowing metering valve port 126 and operates a valve slide 194 connected thereto. The slide has a valve element 196 with aperture 198 connecting a central opening 200 with port 201 receiving fluid $e$. One side of element 196 is connected to sump pressure SP through port 202, and when the slide moves left, ports 201 and 202 communicate to supply sump pressure SP to side 173 of diaphragm 172. Connected to slide 194 is a stop place 204 which abuts fixed plate 206, the two plates being separated by spring 208 and serving to limit the travel of slide 194 and diaphragm 192.

Fluid from path $c$ from pump 86 is impressed upon the diaphragm of converted bypass valve 114 to operate the valve. Similarly, fluid from path $d$ downstream of flow sensing orifice 182 is impressed upon the diaphragm of converted throttle valve 112. Thus, the fuel flow to burner 30 through fuel line 72 is dependent upon the pressure differential between fluid paths $c$ and $d$, which differential is also a measure of the lubricating oil flow from pump 86 as sensed by the flow metering orifice 182. In actual practice, the fuel flow through throttle valve 112 may be equal to the oil flow through orifice 182.

The basic fuel control function is accomplished as follows. Assume the position of the elements as shown in FIG. 2 represents an idle, steady-state condition determined by the idle adjustment pin 161, the conical end of which abuts lever 160 to fix the idle position thereof, and by adjusting screws 180 and 197 which position diaphragms 172 and 192 respectively, to establish the flow of oil through paths $c$, $d$, and $b$ to orifice 130. When it is desired to accelerate gas producer turbine 10, the accelerator pedal is depressed the desired amount to move power lever 164 in the direction of the arrow, which moves lever 160 out of contact with sleeve flange 150 to a position representing the desired speed. Sleeve assembly 142 then moves left in response to the pressure of fluid $a$ and $a'$ until flange 150 again abuts lever 160, this leftward movement causing lever 138 to rotate counterclockwise and force metering spool 122 to move right and also to rotate due to the cam action of cam 137. Movement of spool 122 causes slot 124 to align with port 126 to increase the flow area so that flow of fluid $a$ through the slot tends to decrease the pressure of fluid $a$. The spool movement also increasingly aligns slot 128 with flow-metering orifice 130 to increase the flow area so as to tend to reduce the pressure of oil flowing from path $b$ into the spool. A decrease in fluid pressure $a$ causes diaphragm 192 and sleeve 194 of amplifier valve 190 to move to the right due to the bias of spring 195 to increase fluid pressure $e$ which moves diaphragm 172 and slide 174 of Delta P throttle valve 170 to the right to increase the flow of oil at pressure $d$ through port 184. This in turn increases fluid pressure $b$, restoring the pressure to its original valve such that the diaphragm 172 is in equilibrium with spring 178. This increases the flow through orifice 130 because of its increased area. The oil flow increase through port 184 results in a corresponding increase through flow sensing orifice 182 with the accompanying increased pressure drop thereacross transmitted to converted valves 112 and 114 to provide an equal increase in fuel flow through fuel line 72 to the burner. The increasing combustion rate then causes turbine 10 and shaft 18 to accelerate, which then causes a proportional increase in the speed of pumps 86 and 88 to increase the flow of oil through the respective oil paths.

In actual operation, the cam 137 and spool 122 are designed to provide the proper acceleration flow schedule with respect to the speed of pumps 86, 88 and gas producer turbine 10. During acceleration for varying positions of spool 122 and varying speeds of pump 88, the pressure drop of fluid $a$ across slot 124 remains substantially constant, e.g. at about 54 p.s.i. Similarly, the pressure drop across flow metering orifice 130 is maintained substantially constant by the operation of the Delta P throttling valve 170. Thus, the oil flow through orifice 182 and the corresponding fuel flow through orifice 111 are dependent upon the speed of gas producer turbine 10 and the shape and design of cam 137 and spool 122.

The control system also acts as a speed governor for turbine 10 and prevents the engine from exceeding the selected gas producer turbine speed. As already mentioned, when the selected speed is reached, sleeve head 150 contacts lever 160 to stop movement of sleeve 142 and flow metering valve 120 so that the effective flow area of slot 124 may not increase any more. If the speed of turbine 10 and pump 88 continues to increase, the pressure of oil $a$ will increase to displace the amplifier valve diaphragm 192 leftword, which results in a reduction of the pressure of oil $e$. This causes throttling valve diaphragm 172 and sleeve 174 to move left and reduce the effective side of port 184 which reduces the flow of oil through valve orifice 130 and orifice 182. This in turn reduces the flow of fuel valve orifice 111 and converter valve 112 to burner 30.

When it is desired to decelerate the gas turbine, the operator releases the gas pedal the desired amount to move levers 164 and 160 back to the desired position which causes rightward movement of sleeve 142 and leftward movement of spool 122 to reduce the effective flow size of slot 124. This causes an increase in the pressure of oil $a$ which produces the same operational sequence as that described above with respect to the speed governing function to reduce the fuel flow and speed of the turbine 10.

RECUPERATOR COMPENSATION ON FUEL CONSUMPTION

To increase the operating efficiency of the engine and to reduce the fuel requirements necessary to operate the engine at a given temperature, the recuperator 26 is provided to preheat the air from compressor 16. The temperature probe 100 has an outer casing 220 constructed of a material which expands upon increase in temperature and a center rod 222 of a material, such as tungsten, which is not appreciably affected by temperature. Rod 222 is connected to lever 224 pivoted to casing 70 and abutting valve plate 226 spaced from sleeve 228 of diaphragm 230 by spring 232. A slide valve 234 is connected at one end to diaphragm 230 and biased at the other end from casing 70 by spring 236. The slide 234 has a valve head 238 with central opening 240 communicating with longitudinal opening 242 to impose an oil pressure $f$ from port 244 on the right side of diaphragm 230. Port 246 receives fluid $a$ and port 248 receives oil at sump pressure SP. Changes in oil pressure $f$ are transmitted to the left side of amplifier valve diaphragm 191.

Fluid $f$ also passes through compensator orifice 250 where it is reduced to fluid pressure $g$ acting upon compensator diaphragm 252 against the bias of spring 254 and sump pressure SP.

Upon a rise in the temperature of the exhaust gases sensed by probe 100, tube 220 expands to rotate lever 224 counterclockwise by rod 222. This reduces the load applied to spring 232 thereby allowing the slide 194 to move leftward communicating through 238 to low pressure, SP, and thus reduces pressure $f$ imposed on diaphragm 191 of valve 190. Also during acceleration when slide 194 is displaced to the right, pressure $g$ communicates with $e$ and is applied to Delta P diaphragm 172. Hence, upon a temperature rise and a reduction in pressures $f$, $g$, and $e$, the diaphragm 172 reduces the fuel flow to the engine by reducing the oil flow of the flow metering valve orifice 130.

Thus, the exhaust gas temperature ($T_R$) compensation is effective to lean out or to enrich the acceleration fuel schedule by anticipating a change in recuperator heat output as the gas temperature changes. Without this recuperator compensation, the acceleration fuel schedule would be too rich at times when the recuperator was hot, for example during downhill braking, resulting in recuperator over-temperature or compressor surge, or it would be too lean when the recuperator was cold, e.g., during initial lightoff, resulting in slow acceleration rates.

VARIABLE NOZZLE CONTROL

The control unit 70 also controls the variable positionable nozzle 14 which cooperates with the fuel control schedule to provide maximum operating efficiency. The provision of a variable area power turbine nozzle produces numerous engine performance benefits, but also adds considerably to the control system requirements. The primary purpose of the variable nozzle, apart from the benefits derived from its use for power turbine braking, is to provide capability for extracting varying amounts of power from the gas producer turbine 10 for driving auxiliaries such as vehicle accessories and pumps 66, 84, 86, and 88. In addition, considerable improvement in part load economy is realized by operating the engine at higher part load temperatures. With the invention, the variable nozzle is controlled to provide ancillary benefits of improved acceleration and deceleration response.

If the nozzle were held in a fixed position, the steady-state gas producer speed would be controlled by modulating the fuel flow to the engine as discussed above with regard to the prior art. In this case, the engine operating temperatures would be determined solely by the thermodynamic matching requirements of the engine. The addition of the variable nozzle, however, permits the independent selection of any desired temperature while holding the gas producer speed constant. A particular combination of fuel flow and nozzle throat area will automatically fix both the temperature and the gas producer speed.

Control of the variable nozzle is achieved in such a manner as to maintain steady-state gas producer speed by varying nozzle position, while the exhaust temperature ($T_R$) is controlled by fuel flow modulation. This scheme results in automatic opening of the nozzle during acceleration and closing of the nozzle during deceleration, with a corresponding reduction in gas producer acceleration and deceleration times. In order to realize the best engine response, of course, it is also necessary to increase the fuel flow to the maximum safe acceleration fuel schedule during accelerations. These functions are achieved in the invention through a sequential relationship between the temperature and speed control modes.

In a fixed nozzle engine, the power to accelerate the gas producer is obtained by increasing the fuel flow to an amount in excess of that required to maintain steady-state operation. In an engine with a variable power turbine nozzle, some of the power normally applied to the output (power turbine shaft) can be transferred to the gas producer by opening the nozzle vanes. Therefore, even at constant fuel flow, the gas producer turbine can be made to accelerate by opening the nozzle, or to decelerate by closing the nozzle. In fact, the engine can be run at various steady-state temperatures by, say, increasing the fuel flow, and then closing the nozzle somewhat to prevent the gas producer from accelerating.

In a fixed nozzle engine, the temperature is lower at part speed than at full speed operation. However, better fuel economy is achieved if the temperature is kept as high as possible. In the invention, therefore, the fuel flow is maintained at a high enough level to hold the exhaust temperature ($T_R$) constant, and the variable nozzle is positioned so as to maintain the selected gas producer speed.

In order to obtain the fastest possible acceleration of the gas producer, it is necessary to increase the fuel and to open the nozzle to the position at which it transfers the greatest amount of power to the gas producer turbine. This is in the so-called "neutral" position, and occurs at about ⅓ of the maximum travel of the actuator 97. The remaining travel is used for braking purposes, and will be discussed later. During deceleration, it is necessary to decrease the fuel and to close the nozzle in order to slow the gas producer rapidly. For steady-state operation, both the fuel flow and nozzle position must be properly controlled in order to obtain the proper temperature and speed.

When acceleration is desired, fluid $c$ from actuator pump 86 is delivered to relief valve 260 having relief spring 261, which maintains fluid $c$ at a predetermined pressure, e.g., 500 p.s.i., and relief port 262. Fluid then flows from port 264 at a pressure $h$ to annular recessed sleeve port 265 and on to the rod end of actuator piston 97. Fluid also flows from recess 265 through sleeve port 266 to port 268 where it exits at pressure $i$, passes through normally open nozzle stop valve 270 to pressure $j$, through normally communicating ports 272 and 274 of power turbine nozzle valve 276 to pressure $k$ and the head end of actuator piston 97. Because the head end has a larger effective area than the rod end and because of the operation of nozzle stop valve 270, the actuator piston is held in the "neutral" position, with the pressure $k$ maintained at a lower pressure (e.g. 250 p.s.i.) than the pressure $h$ acting on the opposite end of piston 97.

The piston is prevented from going past the nozzle "neutral" position, which is about ⅓ the total distance of travel of the piston 97 from cylinder end wall 97a, by the nozzle stop valve 270. As shown in FIG. 3, when the piston is moved away from wall 97a toward neutral position, feedback lever 99 and rotary valve sleeve 270 are rotated counterclockwise to disconnect fluid paths $i$ and $j$ by rotating the sleeve so that path $j$ is out of communication with recess 270a and is in partial communication with sleeve recess 270h connected to low pressure SP. This stops flow of oil to the head end of the piston when it reaches the neutral position, and reduces pressure $j$ until the forces due to pressures $h$ and $k$ acting on unequal areas of opposite ends of piston 97 are in equilibrium.

As discussed earlier, when accelerating, the slide 152 through ports 170a and 172a transmits fluid at pressure $a'$ acting on sleeve 147 to position lever 138 and open slot 124 to maintain fluid $a$ from pump 88 at a relatively constant pressure of, e.g., 54 p.s.i. This provides a displacement of sleeve 142 and valve 120 which is proportional to the speed of the gas producer 10. When sleeve 142 moves leftward into engagement with lever 160 positioned at the speed selected by power lever 164, movement of the sleeve is stopped and any further increase in speed of the gas producer turbine 10 and pump 88 will cause fluid pressure $a$ to rise. This causes slide 152 to move leftward relative to sleeve 142 until ports 266 and 267 begin to function, which, e.g., may occur at approximately 60 p.s.i.

The increase of pressure $a$, e.g., from 54 to 60 p.s.i., acting on diaphragm 192 of amplifier valve 190 causes valve slide 194 to move left to reduce the fluid pressure $e$. This in turn results in leftward movement of slide 174 of throttle valve 170 and a reduction in pressure $b$ with a corresponding reduction in fuel flow to that required for steady-state operation. However, since the piston 97 and nozzle 14 are still in the neutral position, the gas producer turbine 10 will continue to accelerate until the pressure $a$ rises slightly above 60 p.s.i., at which time slide 152 is moved sufficiently leftward to open port 267 to sump pressure (SP) and close ports 266 from high pressure $h$. This causes pressure $k$ on the head end of piston 97 to drop and the pressure $h$ still acting on the rod end through annular port 265 to move the piston and nozzle 14 in the closed nozzle direction. As a result, oil is displaced from the piston head end back through valve 276, check valve 280, and ports 268 and 267 to sump (SP).

As the nozzle closes, feedback lever 99 rotates sleeve valve 270 clockwise on power lever shaft 162 and within casing 70. The shaft is mounted eccentrically within sleeve 270 so that as the nozzle 14 closes, the lever 160 fixed to the shaft is moved to the left a slight amount. Sleeve 142 follows lever 160 leftward, thus rotating lever 138 to rotate and move spool 122 to the right which opens slot 124 until the pressure $a$ is returned to 60 p.s.i. At this condition, both ports 266 and 267 are closed and the actuator piston 97 comes to rest at a steady-state position. The application of 60 p.s.i. pressure to diaphragm 191 of the amplifier valve 190 will maintain the proper fuel flow for a steady-state operation and will maintain the nozzle 14 and actuator piston 97 at fixed steady-state position with both ports 266 and 267 closed. This occurs only when the rate of flow of oil from the gas producer pump 88 is such to maintain a 60 p.s.i. pressure drop across slot 124 of the flow metering valve 120. If the speed of turbine 10 and pump 88 rises, nozzle 14 will close and reduce the speed to its original value. If the speed falls, the nozzle will open, and the gas producer will accelerate to restore the proper speed. The pump 88 and valve ports 266 and 267, therefore, act as a governor to maintain the selected speed, while the pressure $a$ remains substantially constant so that the amplifier valve 170 will maintain the proper steady-state fuel flow.

Thus, it is apparent that the amplifier valve 190 functions to regulate pressure $e$ applied to throttle valve diaphragm 172, which in turn controls pressure $b$ and the fuel flow to the engine. Throttle valve 170, through adjusting screw 180 and spring 178, maintains pressure $b$ slightly higher than pressure $e$ (about 4 p.s.i.) to establish an idling fuel flow rate. During acceleration, amplifier valve 190 can raise pressure $e$ as high as pressure $g$ or as low as sump pressure SP, depending upon changes in pressure $f$ related to temperature ($T_R$). During deceleration and a rise in pressure $a$, valve 190 establishes pressure $e$ at sump pressure SP. However, pressure $b$ is prevented from falling below the idle pressure of 4 p.s.i. and a minimum fuel schedule is maintained to prevent flameout.

During steady-state operation, amplifier valve 190 operates to amplify the temperature ($T_R$) signal pressure $f$ to control the fuel flow as necessary to maintain constant exhaust temperature ($T_R$). The ratio of areas of diaphragm 191 and the slide 194 is large, e.g. 8:1, so that the valve 190 operates such that when pressure $a$ is constant at 60 p.s.i. during steady-state conditions, a few degrees rise in temperature ($T_R$) reducing pressure $f$ will cause a large drop in $e$, thereby, reducing fuel flow to the minimum and a few degrees reduction in ($T_R$) will increase fuel flow to the maximum. The actual set point for valve 190 corresponding to the desired temperature ($T_R$) is established by the relative area of the diaphragm 191, 192 and by adjusting screw 197 and spring 195.

POWER TURBINE BRAKE CONTROL

By merely extending the rotation of the variable nozzle vanes beyond the neutral position to the reverse position, the torque applied to the power turbine 12 can be nullified or reversed. This feature permits positive protection against power turbine overspeed, and provides aerodynamic vehicle braking for downhill operation and improved handling in traffic. In the invention, a power turbine speed topping system is included to override the nozzle control, which otherwise regulates gas producer speed, by driving the nozzle toward the reverse position. This occurs any time the power turbine speed exceeds the allowable maximum, thereby preventing power turbine overspeed such as might occur during inadvertent clutch disengagement. During downhill operation, this same feature provides negative torque to the power turbine to maintain a controlled vehicle speed with minimum use of the air brakes.

Due to the high inertia of the rotating parts, and the long thermal lag of the recuperator, shaft power decay in a gas turbine-powered engine would normally be prolonged, without power turbine braking, when compared to a reciprocating power plant, for example. In a reciprocating engine, of course, a small amount of engine braking is available during vehicle decelerations.

With the invention, however, a reduced power turbine speed is demanded when the operator removes his foot from the accelerator pedal. Under these circumstances, power turbine braking is applied in order to slow the vehicle more rapidly. This feature provides improved handling in traffic, and is achieved without any fuel consumption penalty.

At idle conditions, with the transmission in neutral, the power turbine brake control maintains the nozzle in the neutral position to minimize the idle fuel flow requirement.

The power turbine brake control is intimately related to the power turbine synchronizing feature which will be described below. The purpose of the synchronizing mechanism is to match the speed of the power turbine output shaft to that of the transmission input shaft during shifting. For this reason, the power turbine brake control senses two speeds, the speed of power turbine 12 and transmission input 43. These speeds are sensed by comparing the output flows of two matched coaxially driven pumps 106 and 108 mounted in gear box 20. Pump 106 is connected to the forward clutch plate 41 driven by the power turbine shaft 40. Pump 108 is connected to the rear clutch plate 44 driven by the transmission input shaft 43. Thus, during normal operations with the clutch engaged, pumps 106 and 108 are driven at identical speeds and the flow from each is proportional to the speed of power turbine 12.

The power turbine servo valve 276 functions to control the nozzle 14 and piston 97 toward the reverse braking position whenever the flow output from power turbine pump 106 exceeds that corresponding to a maximum limiting power turbine speed. Valve 276 includes a piston 290 connected to slide 278, the piston being displaced to the right during normal operation when the power turbine speed is low. This holds the valve port 274 in open communication with port 272 and pressure $j$ to communicate this pressure directly to the head end of actuator piston 97. Under this condition the nozzle 14 and actuator 97 are controlled by the gas producer speed as described above.

Flow from transmission pump 108 at a pressure $m$ passes through a power turbine reset valve 300 having an inlet port 302 controlled by slide member 304. The slide is moved within casing 70 by power turbine lever 306 fixed on shaft 162 in such a manner that during acceleration the lever 306 is rotated counterclockwise and slide 304 is moved to the right to open port 302. The flow then passes at a pressure $n$ through adjustable orifice 308 to sump (SP), the pressure $n$ being applied to the left end of piston 290. A relief valve 310 having a hollow slide member 312 with ports 314 communicating with the flow at pressure $m$ prevents this pressure from exceeding a predetermined value, e.g. 60 p.s.i. Adjusting screw 311 and spring 313 establish the relief pressure of relief valve 310.

Flow from power turbine pump 106 at a pressure $p$ passes through an orifice 316 to sump (SP), the pressure $p$ being applied to the right end of piston 290. The adjustable orifice 308 is calibrated so that, as long as both pumps 106 and 108 run at the same speed, i.e., the clutch is engaged, and the pressure $m$ is less than the predetermined pressure (60 p.s.i.), i.e., the relief valve 310 is closed, the pressure $n$ will always be equal to the pressure $m$ and $p$. Under those conditions, the springs 292 and 294 are designed to hold the piston 290 lightly to the right so that ports 272 and 274 are normally in flow communication with each other.

In actual operation, when power lever 164 is advanced more than about ⅓ of its available travel, the port 302 of reset valve 300 is substantially wide open so that there is very little difference in the pressure $m$ and $n$. The variout orifices are designed so that the pressure $m$ will reach the setting of relief valve 310 (60 p.s.i.) when the speed of the pump 108 reaches a predetermined limiting speed corresponding to a limiting speed setting on the power turbine, e.g., 110% of rated power turbine speed. If the speeds of the pumps 106, 108 and power turbine 12 are less than the limiting speeds, the piston 290 remains in the right-hand position with ports 272 and 274 in flow communication and the nozzle braking system is inactive. However, if the speeds exceed their limiting values, the flow from pump 108 will increase so that pressure $m$ tries to exceed the relief pressure setting (60 p.s.i.) of relief valve 310. The relief valve will open and the excess flow is dumped to sump pressure (SP) through ports 314. Thus, the pressure $n$ on the left end of piston 290 will not exceed the relief setting (60 p.s.i.) no matter how much faster than the limiting speed pump 108 goes. But, since the speed of pump 106 is also increased, the pressure $p$ on the right end of the piston rises to force the piston to the left to establish flow communication between ports 274 and 275. This applies high pressure $h$ (e.g. 500 p.s.i.) directly to the head end of piston 97 to move the piston and nozzle 14 in the open direction, toward braking. The power turbine braking control can then force the nozzle to move to a reversal position, since the nozzle stop valve 270 is ineffective as long as the valve 276 is moved to the left to block communication between ports 272 and 274 and thus prevent pressure $j$ from reaching the head end of piston 97.

In general, as mentioned previously, motion of the nozzle in a power reducing direction if sufficiently far, reduces the torque applied to the power turbine to zero, and finally reverses the torque to produce a braking effect. The nozzle actuator may be designed to have the capability of reaching the full braking position within less than ½ second and provides a very effective limit to maximum power turbine speed. During downhill operation, with the clutch engaged, the system will apply braking as necessary to prevent the power turbine speed from exceeding the 110% setting. A large braking horsepower is available to retard the vehicle, thus preventing excessive wear on the vehicle brakes.

The control system of the invention is also effective to provide braking at the operator's command whenever he removes his foot from accelerator pedal 77. When this is done, lever 306 rotates clockwise to move reset valve slide 304 left and partially close port 302, which causes pressure $m$ to rise. When pressure $m$ reaches the set pressure on release valve 310, the valve opens and dumps part of the flow from pump 108 to sump (SP). This causes pressure $n$ to drop and piston 290 to move left, thus causing power turbine braking as described above.

In order to provide a stable power turbine control which does not cause oscillation in speed or nozzle position, it is desirable to provide a feedback to the valve 276 which is proportional to the position of nozzle actuator piston 97. To accomplish this, a variable orifice 271 on nozzle feedback sleeve 270 (see FIG. 3) opens slightly as the piston and nozzle move toward the braking position, thus dumping a portion of the flow $p$ from pump 106 to sump (SP) and reducing the pressure $p$ as the nozzle opens. This provides "droop" for the power turbine control so that the power turbine speed must increase by about 4% above the set speed in order to obtain the full braking position.

POWER TURBINE SYNCHRONZING CONTROL

Because of the high rotating speed of the turbine engine, the stored energy which must be dissipated during shifting of gears is many times greater than for an equivalent reciprocating power plant. As a result, specially designed power-shift transmissions capable of large energy absorption have been considered. The increased complexity of this type of transmission would add to the initial cost of a turbine engine compared to conventional reciprocating engine installations. This cost penalty is avoided in the turbine engine installation of the invention by taking advantage of the power turbine braking feature to synchronize the power turbine speed with the transmission speed prior to clutch engagement. The control system compares power turbine speed of power shaft 40 with that of the transmission input shaft 43 and overrides the normal gas producer control made to bring these speeds into synchronization. This feature utilizes reverse nozzle braking, which is needed in any event for power turbine overspeed protection, to dissipate the stored energy of the turbine engine during shifting. The need for specially designed clutches is thus obviated.

When the clutch 42 is disengaged and the load on the power turbine 12 is suddenly removed, the power turbine speed increases, while the transmission speed decreases in proportion to road speed. The flow from the power turbine driven pump 106 increases, and the pressure $p$ rises, while the pressure $m$ from the pump 108 remains unchanged or is reduced. The piston 290 is moved to the left, which admits high pressure $h$ directly to the head end of the actuator 97, driving the actuator and nozzle 14 toward braking position. This action reduces the torque applied to the power turbine until the turbine stops accelerating. The turbine will be slowed down until the flows from the two pumps 106 and 108 and the corresponding pressures $p$ and $n$ across the piston 290 are again equal. In other words, the power turbine speed will be restored to a speed just about equal to that of the transmission, even though the clutch is disengaged.

CLUTCH INHIBITOR

Improper shifting procedure, which might result in power turbine overspeed or excessive clutch wear, is prevented by the addition of a clutch inhibitor. This device prevents clutch engagement under conditions described below.

Inasmuch as the synchronizing control always tries to match the speed of the power turbine 12 to that of the transmission 46, it is necessary to take precautions to prevent the power turbine from being driven to an excessive speed, should the operator inadvertently shift into the wrong gear. In this event, the transmission could be driven to an excessive speed by the inertia of the vehicle itself. The invention prevents the power turbine 12 from synchronizing with the transmission 46 if the speed is excessive and provides a signal which prevents the clutch 42 from being engaged under this condition.

If the transmission speed exceeds the power turbine speed requested by the operator, (e.g., 110% maximum when the power lever 164 is advanced, and the valve 304 is open), the pressure $m$ from the transmission pump 108 will rise to the relief pressure (60 p.s.i.) opening the relief valve 310, which prevents the pressure $m$ from rising above the relief pressure. Assuming that the clutch is not engaged, the power turbine speed will rise, tending to synchronize with the transmission, until the pressure $p$ is equal to the pressure $n$. Any further increase in power turbine speed will result in the application of nozzle braking. Since the pressure $n$ cannot exceed the relief pressure (60 p.s.i.) which corresponds to the maximum pressure obtained at 110% speed, the power turbine 12 speed will be limited to a maximum of 110% speed, even though the transmission speed may be higher. If the operator were to engage the clutch under this condition, there would be a large relative velocity between the clutch plates 41 and 44 which would result in a large amount of clutch wear. Furthermore, the inertia of the vehicle would be sufficient to drive the power turbine 12 to an overspeed condition. To prevent this, the slide 312 of relief valve 310 has two port openings, 314 and 316. The valve is so designed that, as the pressure $m$ rises, approaching 60 p.s.i., the port 316 opens, venting oil through an orifice 318 to sump (SP). This flow produces an increase in the pressure Q which is used as a signal to operate an automatic device (not shown) on the transmission which prevents the clutch 42 from being re-engaged. This prevents the operator from engaging the clutch under conditions which would result in a dangerous power turbine overspeed or possible clutch burnout. When the operator has corrected his error in shifting, or slowed the vehicle by application of vehicle brakes, such that transmission speed is reduced to less than the requested speed, normal clutch engagement is permitted.

GAS PRODUCER CUT-BACK

The power turbine braking feature of the invention provides a positive control of the maximum power turbine speed, regardless of how much power the operator may request. In this sense, it acts as a road speed governor, preventing the vehicle from exceeding a certain speed, depending on the gear ratio. Unfortunately, it is not economical to operate the vehicle with full power request, i.e., maximum gas producer speed, and then to throw away the unneeded power by application of the power turbine brake.

In general, the most economical condition is achieved by cutting back the speed of the gas producer 10 until the power delivered to power turbine 12 is just enough to satisfy the power required to operate the vehicle at the desired road speed. This could, of course, be achieved manually by the operator, simply by retarding the power lever 164 until braking is no longer required to hold the desired power turbine speed. Under this condition, the control of the engine reverts to the normal steady-state mode, with $T_R$ temperature maintained constant. The invention, however, incorporates an automatic gas producer cutback feature which acts to reduce gas producer speed any time power turbine braking action occurs. This makes it possible to use the power turbine speed control as a road speed governor without the attendent poor economy. It is characteristic of the engine that the reduction in gas producer speed does not significantly reduce the availability of reverse torque for downhill braking. High pressure fluid $c$ is supplied to a pair of orifices 320 and 322 and, at pressure $t$, to a valve port 324 on the spool 278 of the power turbine servo valve 276. During normal operation, when the power turbine 12 speed is low, the piston 290 is held to the right, and the valve 324 is open, venting pressure $t$ to sump pressure (SP). Under this condition, the intermediate pressure $r$ between the orifice 320 and 322 provides a fixed load against the end of the spool 122 sufficient to balance the pressure $a$ on the end of the gas producer servo sleeve 144, and is needed for proper functioning of the gas producer control.

Whenever a power turbine overspeed occurs, the piston 290 moves to the left, to call for power turbine braking, and closes the valve port 324. This causes the pressure $r$ to rise to pressure $h$ (500 p.s.i.). The added force on the end of the spool 122 moves the spool to the left, and acting through the lever 138, moves the sleeve 144 to the right, regardless of the position of the lever 160 selected by the operator through the power lever 164. As the spool 122 moves to the left, the slot 124 begins to close and the pressure $a$ rises, displacing the diaphragm 192 of the amplifier valve 190 left, which reduces the fuel flow to minimum, and causes the gas producer to decelerate. When the gas producer speed has been reduced sufficiently that power turbine braking is no longer required to maintain power turbine speed, the piston 290 moves to the right, opening the valve 324 and restoring normal control.

In order to provide for stable operation of the power turbine during this operation, it is necessary to provide feedback pressure $s$ on the end of the spool 278, which is controlled by an additional valving port 326 on the spool 152 of the gas producer control. Whenever gas producer cutback occurs, and the pressure $a$ rises, the spool 152 is displaced to the left within the sleeve 144, opening the port 326, and increasing the pressure $s$ slightly by passing flow from port 326 to port 328, to oppose the cutback request.

If the power turbine overspeed persists, as during downhill operation, the gas producer speed will be reduced all the way to idle. In order to prevent the gas producer speed from falling below idle, a port 330 is provided on the valve 120, which opens when the speed approaches idle speed, thus overriding the cutback valve 324.

AMBIENT TEMPERATURE AND ALTITUDE COMPENSATION

In order to prevent the total delivered horsepower and/or stalled torque from exceeding rated values, it is desirable to prevent the operator from selecting maximum gas producer speed at low ambient temperatures. In addition, the steady-state recuperator gas-in temperature ($T_R$) must be reduced, on a cold day, to maintain sufficient compressor surge margin for satisfactory operation.

Figure 4:
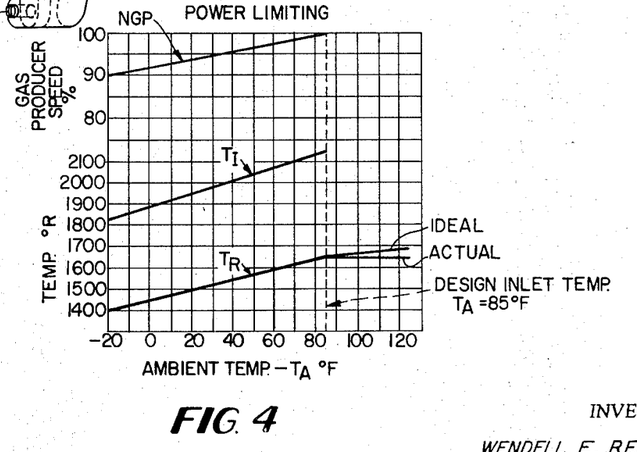
FIG. 4 illustrates typical temperature-speed conditions for the engine of the invention.

FIG. 4 shows typical engine performance parameters at constant horsepower for various ambient temperatures. The rated condition (at 500 ft. altitude on an 85° F. day) is 100% gas producer speed ($N_{gp}$) at a $T_R$ temperature of about 1653° R. on hotter days $N_{gp}$ and $T_R$ are held constant to avoid exceeding limiting steady-state turbine inlet temperature (e.g. $T_T$=2160° R.). On colder days maximum allowable speed and turbine inlet temperatures are reduced, until, with ambient temperature $T_A$=—20° F., the gas producer speed is only 90% and the $T_R$ temperature 1400° R. At this condition (—20° F.), the delivered power is approximately the same as the design condition (85° F.).

Altitude compensation of the fuel schedule is achieved by an altitude compensated orifice 111 in the converter valve assembly. The size of orifice 111 is controlled by lever arm 332 pivoted at 334 and operated by aneroid 336 which includes a bellows 338 and outwardly biasing spring 340. As previously described, the appropriate fuel schedule is computed using lube oil as a medium. The flow of oil through orifice 182 is proportional to the flow of fuel desired in the engine. If the orifices 182 and 111 are of equal size, then these two flows will be equal. However, as altitude increases, and the air flow through the engine decreases, less fuel is required by the engine to maintain the same temperatures. At higher altitudes, the size of orifice 111 is reduced, so that less fuel is delivered to the engine.

Ambient temperature compensation is achieved by a ($T_A$) temperature probe 350 which comprises a steel tube 352 and tungsten rod 354, the differential expansion of which controls two valves 356 and 358 which act to reduce the gas producer speed and recuperator temperature ($T_R$), respectively, on cold days. The pressure $a$ from the pump 88 is supplied to the $T_A$ probe assembly 350. On cold days (—20° F.), the valve 356 in the $T_A$ probe is closed and there is no path for the flow from the pump 88 except through the speed sensing slot 124 to sump (SP). The maximum gas producer speed ($N_{gp}$) adjustment on the power lever 164 is adjusted so that, in accordance with FIG. 4, 90% gas producer speed is the maximum attainable at full power lever position. The idle gas producer speed $N_{gp}$ adjustment is set so that on a cold day the idle speed will be approximately 45% speed.

On warmer days, the differential expansion of the $T_A$ probe 350 raises rod 354. Biasing spring 360 rotates lever 362 clockwise and moves diaphragm 363 and slide valve 364 leftward to open valve 356 and pass fluid $a$ through valve 358 to sump (SP). This flow path is established in parallel with the path through speed sensing slot 124. Thus, on a hot day, at any given setting of power lever 164, the gas producer speed sensing pump 88 must run faster in order to maintain the proper steady-state pressure $a$, i.e., 60 p.s.i. For example, the valve orifice 356 may be designed so that on an 85° F. day, 100% gas producer speed is attainable at full position of power lever 164 and idle speed will be 55% full speed. The valve 356 is prevented from opening farther on any day hotter than 85° F. by stop flange 366 on diaphragm 363, the flange abutting against casing 70 at its maximum left position. Therefore, the maximum gas producer speed is limited to its 100% design speed as shown in FIG. 4.

Valve 358 and orifice 359 are provided to maintain a predetermined relation between the flow through valve 356 and the controlled valve of pressure $u$. The controlled pressure $u$ established by action of spring 368 and diaphragm 363 and valve 356, is used to reset the steady-state recuperator temperature $T_R$ on hot or cold days. These elements operate like a small pressure regulator, varying the pressure $u$ in proportion to the amount of force on the spring 368. On a cold day the spring force is low and the pressure $u$ is low. On warmer days, the differential expansion of the $T_1$ probe increases the spring force and causes the pressure $u$ to rise. With this increased pressure on the left side of the amplifier valve diaphragm 192, the steady-state fuel flow will be increased until the $T_R$ temperature becomes high enough to provide a corresponding reduction in the pressure $f$ from the $T_R$ probe. On cold days, the amplifier valve 190 will control fuel to maintain a lower temperature ($T_R$) of, say, 1400° F. On an 85° F. day, the temperature will rise to a higher temperature such as 1653° F. for steady-state operation. Above 85° F. the $T_R$ temperature remains constant, since the motion of the $T_A$ probe assembly is limited.

From the foregoing description, it is apparent that the invention accomplishes the objects set forth initially and provides a very compact, efficient control system combining fuel regulation with variable positionable nozzle adjustment to control the power and speed of a dual turbine gas producer and power turbine system. The overall control function is rather complex and requires efficient and dependable operation. The control unit, as evidenced from the above description, very effectively performs the multiple control operations at minimum cost and with a simplified structural arrangement by incorporating several individual elements in more than one functional circuit or path to perform several functions in the overall control system. This, of course, reduces the total number of control elements required in the system. For example, metering valve 120 affects the operation of nozzle 14 in addition to regulating the rate of fuel flow through converter valve 112. The servo valve assembly 142 operates on valve 120 to affect fuel flow and also cooperates with power turbine control valve 276 to control the gas producer speed, to apply braking power to power turbine 12, and to synchronize power turbine speed with transmission speed during the shifting of gears. The amplifier valve 190, while functioning in the basic fuel governing circuit, is also an essential part of the ambient and exhaust temperature compensation systems and their operation to modify the basic fuel schedule.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination with a gas turbine engine comprising combustion means for generating gases, a gas producer turbine, a power turbine, variable positionable nozzle means between said turbines, said nozzle means controlling the power transferred to each said turbine as said gases pass therethrough and being positionable in a forward normal steady-state position in which driving power is transferred to said power turbine and a reverse position in which a braking torque is applied to said power turbine to prevent overspeed of said power turbine, transmission means coupled to said power turbine through a clutch mechanism, a control system for positioning said nozzle means comprising first actuator means controlling said nozzle means in said forward position under normal steady-state operation in response to the speed of said gas producer turbine, braking mechanism for said nozzle means including first motor means driven by said power turbine, second motor means driven by said transmission means, servo actuator means controlled by said first and second motor means and operative when at least one of said motor means and said power turbine exceed a predetermined speed to override said first actuator means to place said nozzle means in said reverse position in which a braking torque is applied to said power turbine whereby said power turbine speed is prevented from operating in an overspeed condition.

2. The combination of claim 1, said braking mechanism comprising a first fluid circuit having pump means driven by said power turbine, a second fluid circuit having pump means driven by said transmission means, said servo actuating means including valve means having said first and second fluids applied at opposite ends thereof so that when said first fluid pressure exceeds said second fluid pressure, said servo means is operative to override said first actuator means to position said nozzle means in said reverse position.

3. The combination of claim 2, said second fluid circuit including relief valve means establishing a maximum second fluid relief pressure, whereby such braking mechanism is operative when said transmission means and power turbine are in clutch engagement and said first and second pumps are driven at the same speed.

4. The combination of claim 2, wherein said braking mechanism is operative when said transmission means and said power turbine are disengaged to apply a braking torque to said power turbine to synchronize the speeds of said transmission means and power turbine prior to clutch engagement thereof.

5. The combination of claim 4, said second fluid circuit including relief valve means establishing a maximum second fluid relief pressure, clutch inhibitor means operative when said relief pressure is attained to prevent clutch engagement of said transmission means and said power turbine.

6. In combination with a gas turbine engine comprising combustion means for generating gases, a gas producer turbine, a power turbine, variable positionable nozzle means between said turbines, said nozzle means controlling the power transferred to each said turbine as said gases pass therethrough and being positionable in a forward normal steady-state position in which driving power is transferred to said power turbine and a reverse position in which a braking torque is applied to said power turbine to prevent overspeed thereof, transmission means coupled to said power turbine through a clutch mechanism, a fuel system comprising a fuel source and means for delivering fuel from said said source to said combustion means, speed selector means for selecting a desired gas producer turbine speed, actuator means for positioning said nozzle means, regulator means including scheduling means responsive to said selector means and said gas producer speed to adjust said delivery means to control the flow rate of said fuel and position said actuator and nozzle means in said forward position to establish and govern said producer turbine speed at said selected speed, said regulator means further including a power turbine braking mechanism, acting in response to the speeds of said power turbine and transmission means and operative when said power turbine exceeds a predetermined speed to override said scheduling means and position said nozzle means in a reverse position in which a braking torque is applied to said power turbine to prevent said power turbine from operating in an overspeed condition.

7. The combination of claim 6, said scheduling means including means responsive to the operation of said braking mechanism to reduce the fuel flow and decelerate said gas producer turbine whenever said braking torque is applied to said power turbine.

8. The combination of claim 6, said regulator means comprising fluid circuit means, a first fluid path including first pump means driven by said producer turbine, a second fluid path including second pump means driven by said producer turbine, flow metering valve means in said first fluid path to control the fluid pressure thereof, a servo valve assembly positioned in response to said producer turbine speed selector and said first fluid path pressure, the positioning of said servo assembly resulting in a corresponding positioning of said flow metering valve means to maintain said first fluid path pressure relatively constant, throttle valve means in said second fluid path controlling the fluid flow rate in said second path from said second pump means to said metering valve means in response to fluid pressure deviations in said first path, means for indicating the flow rate in said second fluid path and for adjusting said fuel delivery means as a function of said second fluid path flow rate, said servo valve assembly controlling the flow in said second path to said actuator means to position said nozzle means, nozzle feedback valve means operated by said actuator means to stop the flow in said second path from said servo valve assembly to said actuator means when said desired speed position is reached, said braking mechanism including third pump means driven by said power turbine, fourth pump means driven by said transmission means, servo valve actuator means controlled by fluid from said third and fourth pump means and operative when at least one of said third and fourth pump means and said power turbine exceed a predetermined speed to override said nozzle feedback valve means and communicate said second fluid flow path directly to said nozzle actuator means to place said nozzle means in said reverse position thereby applying a braking torque to said power turbine until the speed of said pump means and said power turbine are reduced below said predetermined speed.

9. The combination of claim 8, said regulator means comprising amplifier valve means actuated by pressure deviations in said first fluid path and positioning said throttle valve means in response to said deviations.

10. The combination of claim 9, said regulator means comprising means responsive to the braking operation of said servo valve actuator means for positioning said flow metering valve means to cause said first fluid path pressure to increase thereby causing said amplifier valve means to adjust said throttle valve means to reduce fuel flow and decelerate said producer turbine whenever braking torque is applied to said power turbine.

11. The combination of claim 8, said third fluid circuit including relief valve means establishing a maximum second fluid relief pressure, whereby such braking mechanism is operative when said transmission means and power turbine are in clutch engagement and said first and second pumps are driven at the same speed.

12. The combination of claim 8, wherein said braking mechanism is operative when said transmission means and said power turbine are disengaged to apply a braking torque to said power turbine to synchronize the speeds of said transmission means and power turbine prior to clutch engagement thereof.

13. The combination of claim 12, said third fluid path includes relief valve means establishing a maximum relief pressure therein, and clutch inhibitor means operative when said relief pressure is attained to prevent clutching engagement of said transmission means and said power turbine.

14. The combination of claim 6, said regulator means comprising temperature means responsive to ambient air and exhaust gas temperatures to compensate said fuel scheduling means for variations therein, and altitude sensing means adjusting said fuel flow rate in response to changes in altitude.

15. In a turbine power plant having a gas producer turbine driving a compressor and a power turbine driven by the gases issuing from said gas producer turbine, said power turbine being connected to a first clutch part selectively engageable with a second clutch part associated with a shiftable transmission; flow control means for controlling the flow of the exhaust gases passing from said gas producer turbine to said power turbine to regulate the speed of said power turbine, means for generating a first signal indicative of the speed of said first clutch part, means for generating a signal indicative of the speed of said second clutch part, means for comparing said signals and detecting a difference between said signals, and means responsive to said comparing and detecting means for positioning said flow control means in a manner to adjust the speed of said power turbine to eliminate the speed differential, if any, between said first and second clutch parts.

References Cited

UNITED STATES PATENTS

| | | | |
|---|---|---|---|
| 2,619,797 | 12/1952 | Haworth | 60—39.16 |
| 2,625,789 | 1/1953 | Starkey | 60—39.16 X |
| 2,660,033 | 11/1953 | Bowden et al. | 60—39.16 |
| 2,912,824 | 11/1959 | Van Nest et al. | 60—39.16 |
| 2,953,940 | 9/1960 | Slemmons. | |
| 3,044,262 | 7/1962 | Chadwick et al. | 60—39.16 |
| 3,124,931 | 3/1964 | Mock | 60—39.16 |
| 3,154,918 | 11/1964 | Kronogard | 60—39.16 |
| 3,313,104 | 4/1967 | Evans et al. | 60—39.16 |
| 3,368,347 | 2/1968 | Wickman | 60—39.16 |
| 3,383,090 | 5/1968 | McLean | 60—39.16 X |

AL LAWRENCE SMITH, Primary Examiner

U.S. Cl. X.R.

60—39.25, 39.28, 235; 192—.033, 103